United States Patent
Tsoref

(10) Patent No.: US 9,563,283 B2
(45) Date of Patent: Feb. 7, 2017

(54) DEVICE HAVING GAZE DETECTION CAPABILITIES AND A METHOD FOR USING SAME

(71) Applicant: Inuitive Ltd., Ra'anana (IL)

(72) Inventor: Ziv Tsoref, Tel Aviv (IL)

(73) Assignee: INUITIVE LTD. (IL)

( * ) Notice: Subject to any disclaimer, the term of this patent is extended or adjusted under 35 U.S.C. 154(b) by 162 days.

(21) Appl. No.: 13/960,391

(22) Filed: Aug. 6, 2013

(65) Prior Publication Data
US 2015/0042552 A1 Feb. 12, 2015

(51) Int. Cl.
*G06F 3/03* (2006.01)
*G06F 3/01* (2006.01)
*G06F 3/0485* (2013.01)

(52) U.S. Cl.
CPC .............. *G06F 3/03* (2013.01); *G06F 3/013* (2013.01); *G06F 3/0304* (2013.01); *G06F 3/0485* (2013.01)

(58) Field of Classification Search
CPC .... G06F 3/03547; G06F 3/041; G06F 3/0412; G06F 3/0414; G06F 3/046; G06F 3/047; G06F 2203/041; G06F 3/03; G06F 3/013; G06F 3/0304; G06F 3/0485; G06F 3/012; G06F 3/005; G02B 27/01; G02B 27/0101; G02B 2027/0138; G02B 2027/014; G02B 2027/0141; G02B 2027/0143; G02B 2027/0165; G02B 2027/0167; G02B 27/017; G02B 27/0172; G02B 27/0176; G02B 2027/0178; G02B 2027/019; G02B 27/02; H04N 7/181; H04N 21/41407; H04N 21/4223; H02B 2027/0187

See application file for complete search history.

(56) References Cited

U.S. PATENT DOCUMENTS

| | | | |
|---|---|---|---|
| 2011/0205148 A1* | 8/2011 | Corriveau et al. | 345/156 |
| 2012/0131491 A1 | 5/2012 | Lee | |
| 2013/0027302 A1 | 1/2013 | Iwaizumi et al. | |
| 2013/0147838 A1* | 6/2013 | Small | G06F 3/013 345/633 |
| 2014/0361971 A1* | 12/2014 | Sala | G06F 3/041 345/156 |

* cited by examiner

*Primary Examiner* — Lun-Yi Lao
*Assistant Examiner* — Jarurat Suteerawongsa
(74) *Attorney, Agent, or Firm* — Hershkovitz & Associates, PLLC; Abe Hershkovitz

(57) ABSTRACT

An electronic device comprising: a display; one or more gaze detection sensors for determining a portion of the display to which a user's gaze is currently directed to; a timer to measure periods of time associated with the user's current gaze at the display; and one or more processors operative to: receive data relating to periods of time measured by the timer and determine therefrom a characteristic rate at which the user shifts his gaze from one portion of the display to another; determine a portion of the display towards which the user's gaze was directed for a period of time longer than a period of time which is expected in accordance with his characteristic rate; identify an object included in the determined portion of the display; retrieve information that relates to the identified object; and enable displaying information which is based on the retrieved information.

14 Claims, 2 Drawing Sheets

DEVICE HAVING GAZE DETECTION CAPABILITIES AND A METHOD FOR USING SAME

TECHNICAL FIELD

The present disclosure generally relates to electronic devices, and more particularly, to electronic devices that have gaze detection capabilities.

BACKGROUND

Eye tracking is the process of measuring either the point of gaze (i.e. where one is looking) or the motion of an eye relative to the head. Typically, an eye tracker is a device used for measuring eye movements and/or positions. There are a number of methods for measuring eye movement. Currently, the most widely used are video-based eye trackers, by which a camera focuses on one or both eyes and records their movement as the viewer looks at some kind of stimulus. Most modern eye-trackers use the center of the pupil and infra red non-collimated light to create corneal reflections. The vector between the pupil center and the corneal reflections may be used to compute the point of regard on surface or the gaze direction.

Eye tracking setups vary greatly; some are head-mounted, some require the head to be stable (for example, with a chin rest), and some function remotely and automatically track the head during motion.

The eye tracking technology is used in various fields. For example for detecting a gaze of a driver of a vehicle in order to assist the driver's driving (e.g. for determining whether or not the driver is driving inattentively).

Another known technique is detecting movement of a pupil of a wearer of a head-mounted device, and determining, based on the detected movement, inputs to a user interface. For example, by using eye gaze detection, the device may change a tracking rate of a displayed virtual image based on where the user is looking. Gazing at the center of the field of view may allow for fine movements of the virtual display. Gazing near an edge of the field of view, may provide coarser movements.

When reading a text on the screen, the reader might sometimes reach a word or a phrase which is unrecognized to him, or is difficult for him to understand within the current context. Such a person can either skip the unrecognized word/phrase or otherwise would need some assistance in order to understand the word/phrase before continue reading. In the latter case, the prior art solutions require that the reader would select the word/phrase and manually search for help or information at the Web or on his own electronic device (e.g. a computer, a tablet, a smart phone, etc.). There are some applications that allow the user to mark or select the unrecognized word/phrase and then provide the result of an Internet search on top of one's current screen, all without having to switch to another application.

Still, even such a solution slows down the reading, and many times causes loss of focus and consequently the reader might fail to complete the reading.

SUMMARY OF THE DISCLOSURE

The disclosure may be summarized by referring to the appended claims.

It is an object of the present invention to provide new method and device to enable displaying information for a user, based on his gaze at a screen of the device.

It is another object of the present invention to provide new method and device wherein the user can be provided with information on objects while gazing at the object so that the user does not have to actively request that information.

Other objects of the present invention will become apparent from the following description.

According to one embodiment, there is provided an electronic device comprising:

a display;

one or more gaze detection sensors (e.g. a camera) operative to determine a portion of the display to which a user's gaze is currently directed to;

one or more timers adapted to measure periods of time associated with the user's current gaze at the display (i.e., when the user of the electronic device is currently looking at the electronic device);

one or more processors operative to:

receive data relating to periods of time measured by the one or more timers and determine therefrom a characteristic rate at which that user shifts his gaze from one portion of the display to another;

determine one or more portions of the display towards which the user's gaze was directed for a period of time longer than a period of time which is expected in accordance with his characteristic rate;

identify one or more objects included in the one or more determined portions of the display;

retrieve information that relates to the one or more objects identified; and enable displaying to the user of information which is based on the retrieved information.

The term "a portion of the display" as used herein throughout the description and claims should be understood to encompass any part of the display, starting from a substantial part thereof down to a part where only one word/icon is displayed.

According to another embodiment, the one or more objects are selected from among a word, a combination of words (e.g. a phrase), an icon, an image, a figure, a logo, a symbol and any combination thereof, converted into a digital representation.

By yet another embodiment the one or more objects is a word or a combination of words and wherein the displayed information relates to the meaning of the word or the meaning of the combination of words (of the phrase).

In accordance with another embodiment, the one or more objects are identified from among objects located at a specific portion of the display, based on at least one parameter. Preferably that at least one parameter is a time period during which the user's gaze remains at that specific portion of the display.

According to still another embodiment, the information displayed to the user comprises a media object. The term "media object" as used herein should be understood to encompass a unit of image data (optionally accompanied by other media data, e.g. sound), and encompasses both individual static images as well as sequences of video images or video frames. Media objects may alternatively or additionally comprise animation data.

By yet another embodiment, the processor is adapted to determine the one or more portions of the display to be portions towards which the user's gaze was directed for a period of time longer than an expected period, comprises determining if the user has not shifted his gaze for a period of time that exceeds a period of time derived from his characteristic rate, by at least a pre-determined period.

According to another embodiment, the processor is adapted to identify the one or more objects being a word and/or a phrase based on detecting (in the respective one or more portions) a word and/or a phrase that had been pre-defined as being potentially inapprehensible for the user. A potentially inapprehensible word may be for example a word that was found to cause a difficulty while reading a text that comprises this word for a relatively large number of people. In addition or in the alternative, it may relate to a word that was found to cause difficulty for the current user on previous occasions, i.e. the word that had been pre-defined as being potentially inapprehensible for the user, is derived from previously retrieved information which relates to the user's vocabulary. In addition or in the alternative, it may relate to a long word (e.g. one that comprises a number of letters that is greater than a pre-defined threshold). Similarly, a potentially inapprehensible phrase may be a phrase which corresponds to any of the alternatives discussed above for potentially inapprehensible words, mutatis mutandis.

According to another aspect, there is provided a method for providing information to a current user of an electronic device which comprises a display and one or more gaze detection sensors operative to determine a portion of the display to which a user's gaze is currently directed to, wherein the method comprises the steps of;

determining a characteristic rate at which the user shifts his gaze from one portion of the display to another;

determining one or more portions of the display towards which the user's gaze was directed for a period of time longer than a period of time which is expected in accordance with said characteristic rate;

identifying one or more objects included in the one or more determined portions of the display;

retrieving information that relates to the one or more objects identified; and enabling display of information which is based on the retrieved information.

According to another embodiment of this aspect, the step of identifying one or more objects is based on at least one parameter being a time period during which the user's gaze remains at a specific portion of the display.

By yet another embodiment the step of identifying the one or more objects being a word and/or a phrase is based upon detecting in the respective one or more portions, a word and/or a phrase that had been pre-defined as being potentially inapprehensible for the user.

In accordance with another aspect, there is provided a computer program product encoding a computer program stored on a non-transitory computer-readable medium for executing a set of instructions by one or more computer processors for establishing a process for providing information to a user of an electronic device that comprises a display and one or more gaze detection sensors operative to determine a portion of the display to which a user's gaze is currently directed to, wherein the process comprises the steps of;

determining a characteristic rate at which said user shifts his gaze from one portion of the display to another;

determining one or more portions of the display towards which the user's gaze was directed for a period of time longer than a period of time which is expected in accordance with said characteristic rate;

identifying one or more objects included in the one or more determined portions of the display;

retrieving information that relates to the one or more objects identified; and enabling display of information which is based on the retrieved information.

BRIEF DESCRIPTION OF THE DRAWINGS

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1:
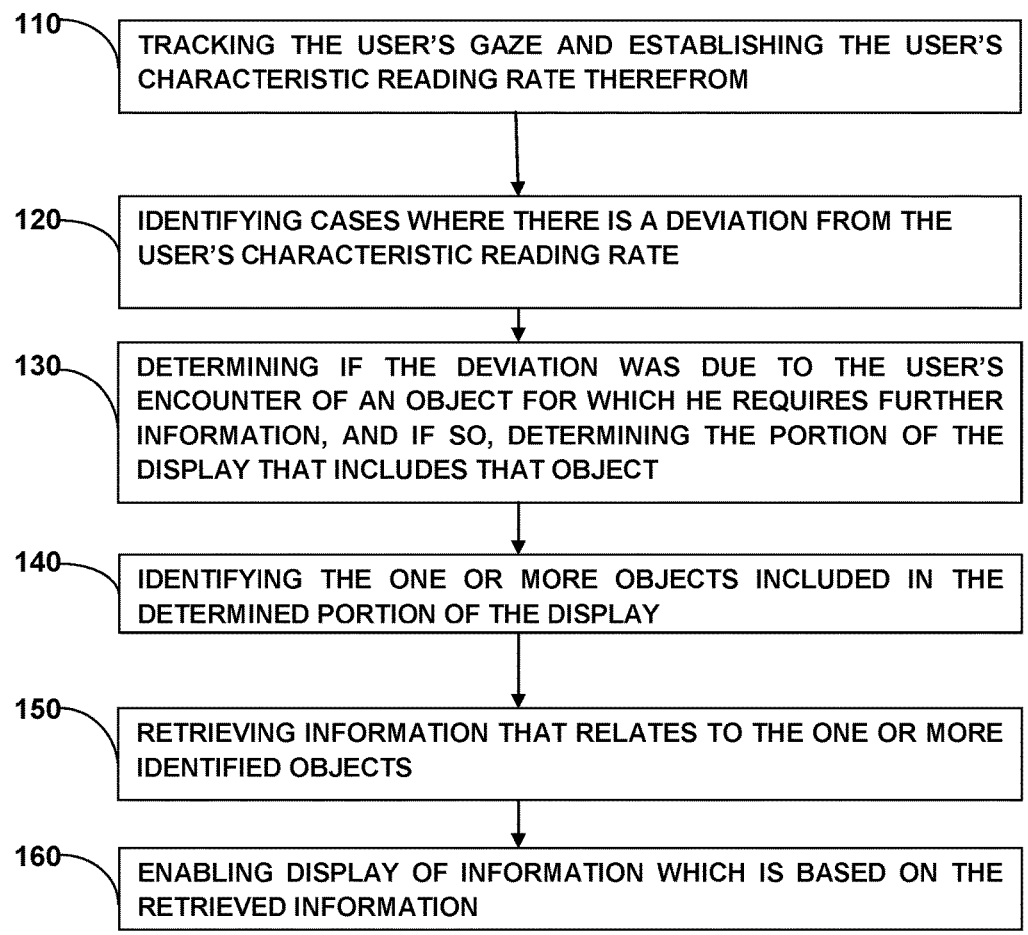
FIG. 1—is a flow diagram exemplifying a method carried out in accordance with an embodiment of the present invention.
Figure 2:
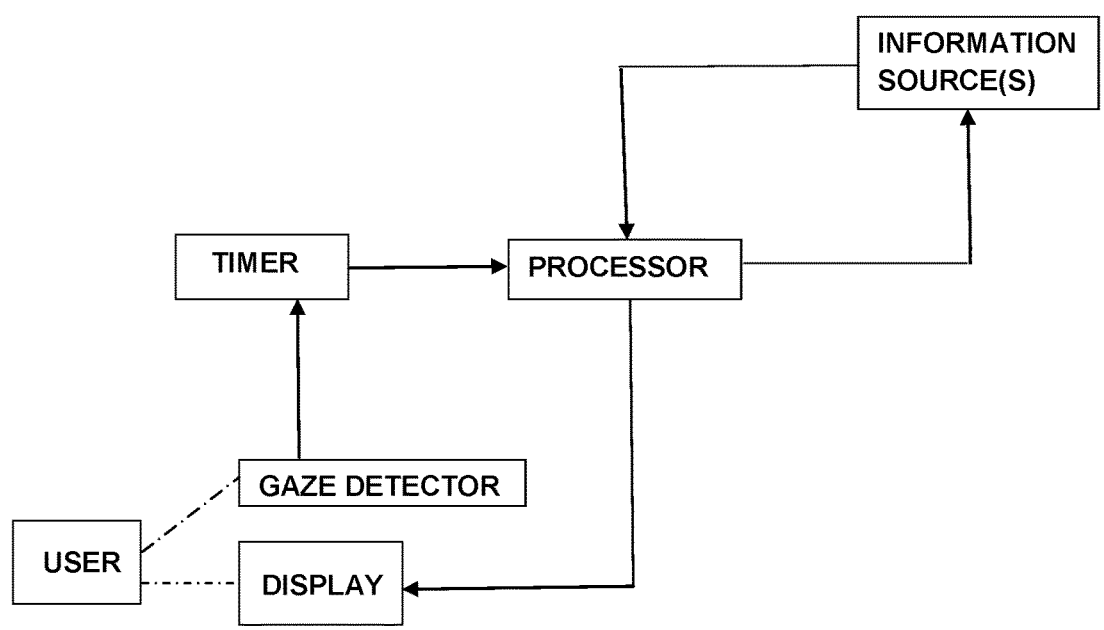
FIG. 2—is a block diagram showing the inter-action between elements of the present invention.

According to an example of an embodiment of the present invention illustrated in FIG. 1, there is provided a method for detecting a user's gaze at a screen (display) of an electronic device which is currently used by that user. In the gaze detection process, the device keeps track (by using gaze detection sensor(s)) after the user's gaze at the screen in order to determine the portion (e.g. the section, area, etc.) of the display at which the user is focused, and consequently, as will be further discussed, which word or phrase that is read by the user at a certain moment presents a difficulty for the reader. During reading, a processor tracks the gaze and identifies the user's normal reading rate (step 110), i.e. the rate at which the user's gaze is shifted from one portion of the display, to another. Obviously, this step may be skipped in case the reading rate has already been determined for that user on one or more previous occasions, and stored at the electronic device. Next, the processor identifies cases in which there is a deviation from the user's normal reading rate (step 120). Such a deviation may be expressed in any one of a number of possibilities, among which are the following ones: exhibiting a slower rate than the user's characteristic rate, cease the reading altogether, jump of gaze (and focus) from the current portion of the display to another region of the screen, and the like.

The processor then determines (step 130) if the deviation was due to the fact that the user has encountered an object, being a word and/or a phrase, for which he requires some help or information. The determination may be based upon any one or more considerations, such as, but not limited to, the following ones:

a. Previously prepared database that comprises potentially inapprehensible words and phrases;

b. Automatic calculation based on language dictionary, word's length, etc.;

c. Previously retrieved information that relates to the vocabulary of the current user.

As was previously explained, the determination of one or more portions of the display is made based on the calculation that the user's gaze has been directed towards such a portion of the display for a period of time longer than a period of time which is expected in accordance with the user's characteristic rate.

The processor then identifies an object (e.g. a phrase) that is included in the determined portion of the display (step 140), e.g. when the user experienced difficulty while trying to understand the meaning of a phrase in its current reading context, and retrieves information that relates to the identified object (step 150), for example, the meaning of the phrase within the current text.

After having retrieved the information that concerns the identified object, the processor enables display of information which is based on the retrieved information (step 160). The processor may carry that out by automatically prompting display of a message to the user inquiring whether he wishes to receive information regarding this phrase. In the alternative, the processor may automatically generate a display of relevant information on the screen (for example, the information may be displayed at the proximity of the phrase within the text).

The solution provided by the present invention is not limited only to text reading (words and phrases) but, as explained above, the identified objects may be icons, symbols, images, etc. For example, the processor may identify situations where the user needs information regarding an image he is currently watching, so that he is provided with the relevant information which can be in a form of a media object being displayed to the user.

As will be appreciated by those skilled in the art the solution provided by the present invention may be regarded as having two major variants. By the first variant, the processor is configured with a setting adapted for an average user, while according to the second variant the processor is operative to be adapted for the individual user. The latter variant can be achieved for example by modifying the processor operation (e.g. modifying the algorithms used for reaching the different decisions taken by the processor) based on information regarding the user's vocabulary (e.g. by establishing the reading level of the user) as retrieved during previous interactions between the user and the electronic device, so that the results will be tailored to the capabilities of the specific user.

The information provided may be according to an embodiment of the invention context dependent. For example, the word 'tree' in a text which relates to a forest would obviously refer to the original meaning of the word "tree" which means a grown plant. However, in a text that relates to computer algorithms, the word "tree" would have a different meaning as it will refer to a type of data-structure and thus, by analyzing the text context, the information provided can be automatically adjusted to ensure its relevancy to the current context.

Furthermore, the processor may have more than one level of information for display to the user. The different levels may be manually configured (e.g. by the user) and in addition or in the alternative, the different levels may be automatically configured by the processor as it learns the user capabilities over the time.

For instance, when a user reads a text that is concerned with computer algorithms and meets the word "tree" for the first time, and the processor identifies that the user is gazing at this word for a long enough period of time, indicating that the user has a certain difficulty with this term or needs some elaboration on this term, the processor may generate detailed information and explanation of the term to be displayed to the user. However, when that user meets this term in subsequent cases, the processor, being aware of the fact that the detailed information concerning this term had already been displayed to the user, may provide only a short summary about the meaning of the term.

By another embodiment, various phrases are classified and associated with different grades of difficulties, so that different level of detailed information may be displayed to the user in accordance with the difficulty grade associated with a respective phrase. The association of different grades may be carried out manually (in advance) or, automatically by the system while searching information on the phrase and the phrase difficulty. For example, the system may search the web for entries that relate to the phrase itself, but also may conduct a number of searches for that phrase, and deduce from the difficulties people are having in understanding the phrase, which grade of difficulty should be associated with that phrase.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An electronic device comprising:
a display;
one or more gaze detection sensors operative to determine a portion of the display to which a user's gaze is directed;
one or more timers adapted to measure periods of time associated with the user's gaze at the display;
one or more processors operative to:
receive data relating to periods of time measured by the one or more timers;
identify a rate which characterizes a normal reading rate of said user, being a rate at which the user's gaze is normally shifted from one portion of the display to another, and wherein said normal reading rate is a user characteristic rate associated with said user;
determine whether there is a deviation in the user's current reading rate from the user's characteristic rate when the user's gaze is directed to one or more portions of the display;
identify one or more objects based on detecting at least one of, a word and phrase that had been pre-defined as being potentially inapprehensible for the user, included in the one or more portions of the display associated with the deviation;
retrieve information that relates to the one or more objects identified; and
enable displaying to the user, information which is based on the retrieved information.

2. The electronic device of claim 1, wherein the one or more objects are selected from the group that consists of a word, a combination of words, an icon, an image, a figure, a logo, a symbol and any combination thereof.

3. The electronic device of claim 2, wherein the one or more objects is a word or a combination of words and wherein the displayed information relates to the meaning of the word or the meaning of the combination of words.

4. The electronic device of claim 2, wherein the information displayed to the user comprises a media object.

5. The electronic device of claim 1, wherein the one or more objects are identified from among objects located at a specific portion of the display, based on at least one parameter being a time period during which the user's gaze remains at a specific portion of the display.

6. A method for providing information to a user of an electronic device that comprises a display and one or more gaze detection sensors operative to determine a portion of the display to which a specific user's gaze is directed, wherein the method comprises:
 identifying a rate which characterizes a normal reading rate of said specific user, being a rate at which the specific user's gaze is normally shifted from one portion of the display to another, and wherein said normal reading rate is a user characteristic rate associated with that specific user;
 determining whether there is a deviation in the specific user's current reading rate from the specific user's characteristic rate, when the specific user's gaze is directed to one or more portions of the display;
 identifying one or more objects based on detecting at least one of a word and a phrase that had been pre-defined as being potentially inapprehensible for the user, included in the one or more portions of the display associated with the determined deviation;
 retrieving information that relates to the one or more objects identified; and
 enabling display of information which is based on the retrieved information.

7. The method of claim 6, wherein the one or more objects are selected from the group that consists of a word, a combination of words, an icon, an image, a figure, a logo, a symbol and any combination thereof.

8. The method of claim 7, wherein the information displayed to the specific user comprises a media object.

9. The method of claim 6, wherein the one or more objects is a word or a combination of words and wherein the displayed information relates to the meaning of the word or the meaning of the combination of words.

10. The method of claim 6, wherein the identifying of one or more objects is based on at least one parameter being a time period during which the specific user's gaze remains at a specific portion of the display.

11. The method of claim 6, wherein the determining of the one or more portions of the display to be portions towards which the specific user's gaze was directed for a period of time longer than an expected period, comprises determining if the specific user has not shifted his gaze for a period of time that exceeds a period of time derived from the specific user characteristic rate, by at least a pre-determined period.

12. The method of claim 6, wherein the at least one of the word and the phrase that had been pre-defined as being potentially inapprehensible for the specific user, are derived from previously retrieved information that relates to the vocabulary of a current user.

13. A computer program product encoding a computer program stored on a non-transitory computer-readable medium for executing a set of instructions by one or more computer processors for establishing a process for providing information to a user of an electronic device that comprises a display and one or more gaze detection sensors operative to determine a portion of the display to which a user's gaze is currently directed, wherein the process comprises;
 identifying a rate which characterizes a normal reading rate of a specific user, being a rate at which the specific user's gaze is normally shifted from one portion of the display to another, and wherein said normal reading rate is a specific user characteristic rate associated with that specific user;
 determining whether there is a deviation in the specific user's current reading rate from the specific user's characteristic rate, when the specific user's gaze is directed to one or more portions of the display;
 identifying one or more objects based on detecting at least one of a word and a phrase that had been pre-defined as being potentially inapprehensible for the specific user, included in the one or more portions of the display associated with the determined deviation;
 retrieving information that relates to the one or more objects identified; and
 enabling display of information which is based on the retrieved information.

14. The computer program product of claim 13, wherein the determining of the one or more portions of the display to be portions towards which the specific user's gaze was directed for a period of time longer than an expected period, comprises determining if the specific user has not shifted his gaze for a period of time that exceeds a period of time derived from the specific user characteristic rate, by at least a pre-determined period.

* * * * *